United States Patent [19]
Kaye

[11] 3,850,525
[45] Nov. 26, 1974

[54] SIMULTANEOUS MULTIPLE MEASUREMENTS IN LASER PHOTOMETERS

[75] Inventor: Wilbur I. Kaye, Fullerton, Calif.

[73] Assignee: Beckman Instruments, Inc., Fullerton, Calif.

[22] Filed: July 9, 1973

[21] Appl. No.: 377,775

[52] U.S. Cl.................... 356/73, 356/75, 356/103, 356/222
[51] Int. Cl.......................... G01n 21/52, G01j 3/44
[58] Field of Search......... 356/73, 75, 85, 103, 104, 356/222

[56] References Cited
OTHER PUBLICATIONS
Kaye et al., Applied Optics, Vol. 12, No. 3, March 1973, pp. 541-550

*Primary Examiner*—Ronald L. Wibert
*Assistant Examiner*—F. L. Evans
*Attorney, Agent, or Firm*—R. J. Steinmeyer; J. G. Mesaros

[57] ABSTRACT

In a laser photometer of the type including means for focusing a laser beam onto a sample, means for receiving a cone of light issuing from the sample in an incremental angle $\Delta\theta$ at a selectable angle $\theta$, means for focusing the cone of light onto the aperture of a field stop, and detector means for measuring the radiant power passing through the aperture in the field stop, there is disclosed apparatus positionable between the field stop and the detector for permitting the making of simultaneous measurements of different characteristics of the radiant power passing through the field stop. The present photometer permits the simultaneous measurement of scattered light at two different angles and the simultaneous measurement of light at two different wavelengths. In the latter case, the present photometer permits the simultaneous measurement of scattered light and fluorescent radiation. Finally, the present photometer may be used to reduce the background level when making light scattering measurements.

16 Claims, 2 Drawing Figures

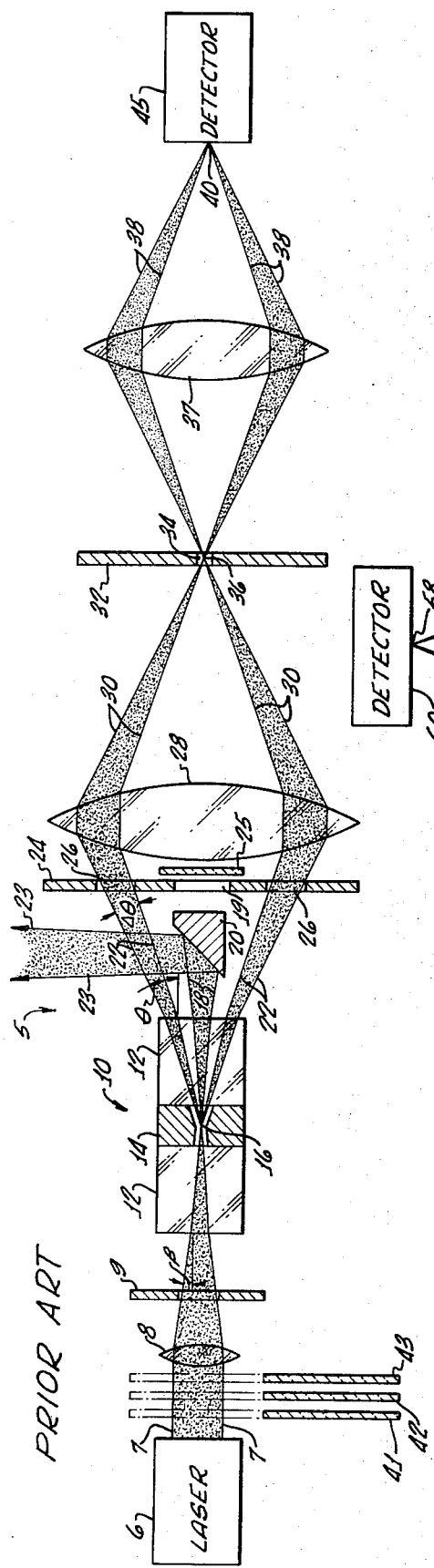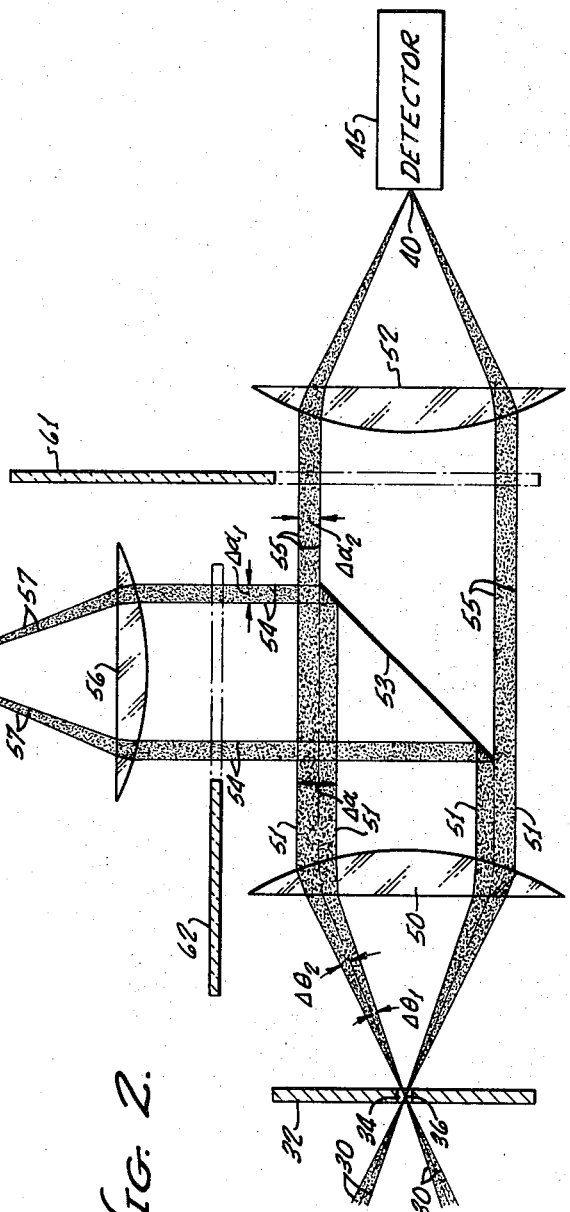
FIG. 1. PRIOR ART
FIG. 2.

SIMULTANEOUS MULTIPLE MEASUREMENTS IN LASER PHOTOMETERS

BACKGROUND OF THE INVENTION

1. Field of the Invention

The present invention relates to laser light scattering photometers for making multiple measurements simultaneously and, more particularly, to apparatus for permitting the simultaneous measurement of light at two different angles or at two different wavelengths in a laser photometer.

2. Description of the Prior Art

Inhomogeneity in the polarizability of liquids and solids leads to the scattering of an incident beam of light. Since this inhomogeneity extends to molecular dimensions, it can be used to characterize the size, motion, and thermodynamic behavior of molecules. The inhomogeneity may be a consequence of fluctuations in concentration or density or may simply result from interfaces between molecular aggregates of different polarizability or refractive index. Consequently, light scattering can be used to study solutions, dispersions, and surfaces.

The intensity of scattered radiant energy depends upon the wavelength of the incident radiant energy, the polarizability of the particles or molecules compared with that of the medium in which they are suspended, and on the size and concentration of the particles. It has also been found that the intensity of the radiant energy scattered in the forward direction by a single particle will be proportional to the square of its volume and independent of its shape if the particle is isotropic and if its dimensions are small compared to the wavelength of the incident radiant energy. Since the forward radiant energy scattered by a dispersion containing particles is greater as the individual particles become larger, the size of the particles may be determined from the intensity of the radiant energy scattered when the refractive indices of the particles and of the medium are known. In a similar manner, the scattering properties associated with particle size have been adapted to the determination of the molecular weights of large molecules.

There are at least three known types of light scattering, Rayleigh, Brillouin, and Raman. These three types of scattering differ in the wavelength of the scattered light. Rayleigh scattering arises because of the concentration and density fluctuations of particles and their medium and the wavelength of the scattered light is approximately the same as that of the incident light. Brillouin scattering arises because of density changes produced by acoustic waves that propagate through a liquid medium and the wavelength of the scattered light relative to that of the incident light is typically shifted both up and down by approximately one-tenth of a wave number. Raman scattering arises because of the interaction between the incident light and the natural resonant frequency of the molecules of the particles and the wavelength of the scattered light is typically shifted by as much as 3,000 wave numbers relative to that of the incident light.

Because of these many light scattering phenomenons, a great deal of information can be derived from light scattering measurements. Furthermore, light scattering is potentially faster, more accurate, and applicable over a wider molecular-weight range than other techniques employing viscosity, osmometry, or gravitational sedimentation. However, several problems have plagued light scattering measurements. In the first instance, the solutions have to be clarified — freed of particles — a procedure that has sometimes required days of preparation. Secondly, large volumes of sample have been required.

The light scattering technique most frequently employed for molecular weight determination involves preparation of a Zimm plot. Extrapolation of the Zimm plot to zero angle and zero concentration permits the determination of the weight average molecular weight. Unfortunately, this extrapolation to zero angle is subject to large errors when the angular function is non-linear and when particles contaminate the sample. Molecular weights above a few million are particularly difficult to determine because of uncertainties in the extrapolation to zero angle.

These measurements would be facilitated and accuracy would be improved if they could be obtained directly at very low angles and concentrations. These problems have stimulated numerous efforts to develop instruments operating at small scattering angles and small sample volumes. Unfortunately, the minimum scattering angle of most commercial light scattering photometers is 20°–30°. Attempts to reduce the scattering angle in custom instruments have been limited to 10°–15° because background signals from unwanted reflections and particulate contaminants increase rapidly with a decrease in scattering angle.

One of the most recent developments in this rapidly evolving field is the measurement of light scattered at small forward angles using a laser as the source of illuminating radiant energy. The laser provides a narrow beam of intense radiant energy which is both monochromatic and coherent in nature. The narrow beam permits scattering measurements at small angles relative to the incident direction of the laser beam. The intensity of the radiant energy contained in the beam enables greater sensitivities than photometer instruments not employing the laser as a source.

Perhaps the greatest advantage of the use of a laser for molecular weight determination is in minimizing the clarification problem. Defraction of incident light scattered by foreign particles of a size comparable to the wavelength of light increases drastically as the scattering angle Θ decreases. This problem is a major contributor to the hazard in extrapolating the Zimm plot to zero angle. However, a laser beam can be focused to a small diameter, achieving an extremely small scattering volume. Typical scattering volumes encountered heretofore were approximately 1 ml whereas this has been reduced to $10^{-4}$ to $10^{-6}$ ml in a laser photometer. As a result, the probability of a foreign particle residing within the scattering volume is proportionately reduced. Because of the high power density, any particle within the scattering volume scatters intensely and its presence is obvious.

The small sample volume required to fill the sample cell further facilitates sample clarification. Sample volumes about 1,000 times less than that of cells in conventional variable angle instruments have been possible. Obviously, with less sample to filter, the clarification can be accomplished in a shorter period of time, an important factor when performing kinetic measurements. The short-path cells also minimize problems of sample absorption. Furthermore, the cell design permits use of flowing filtered samples without allowing them to contact the air.

Another area benefited by the laser is microfluorescence spectroscopy. The monochromatic lines of the laser are useful for exciting fluorescence in a variety of materials and the fact that the beam from these lasers can be focused to a very small spot provides the potential for measurements concerning fluorescence of microscopically small samples. Fluorescing occurs in those molecules which are capable of absorbing light, having their energy level raised as a result thereof to an excited state, and then returning to the ground state by reradiating the light, but at some different frequency. Fluorescence is a valuable analytical tool since in a highly efficient fluorescent system, the energy reradiated is virtually the same as the received energy level whereas in a light scattering system, only one-millionth or even a billionth of the light may be scattered.

The phenomenon of fluorescence is used most frequently as a tracer to analyze selected molecules. For example, fluorescence may be used to study the deoxyribonucleic acid (herein DNA) content of a cell. DNA is the molecule of a cell which dictates its growth. One technique that is employed using fluorescence is to stain the DNA molecule in a cell with a fluorescing material, such as Feulgen stain, and then to use fluorescence to measure the DNA content of the cell and the rate of change of DNA content.

A low angle laser light scattering photometer is described in an article entitled "Light Scattering Measurements on Liquids at Small Angles" by W. I. Kaye, A. J. Havlik, and J. B. McDaniel, Polymer Letters, Volume 9, pages 695–699 (1971). Improvements in this photometer are described in an article entitled "Low Angle Laser Light Scattering — Absolute Calibration" by W. I. Kaye and A. J. Havlik, Applied Optics, Volume 12, No. 3, pages 541–550 (March, 1973) and in an article entitled "Low-Angle Laser Light Scattering" by W. I. Kaye, Analytical Chemistry, Volume 45, No. 2, pages 221A–225A (February, 1973). These articles describe a low angle laser light scattering photometer including a helium-neon laser operating in the $TEM_{00}$ mode, the rays from which are focused by a lens onto a sample confined between two thick silica windows and a black Teflon spacer. Certain of the rays scattered from the sample through an angle $\theta$, defined by an annulus, are focused by a relay lens onto a field stop. Rays passing through the field stop are focused by an objective lens onto the end-window of a photomultiplier detector. The output of the detector is proportional to the total radiant power falling thereon, $P_\theta$.

The primary laser beam, attenuated by suitable attenuators, is transmitted through the sample, in the direction of the incident beam, and is focused by the relay lens onto the field stop. These rays, having a radiant power $P_0$, are then focused by the objective lens onto the end-window of the photomultiplier detector. The ratio $P_\theta/P_0$ is utilized to determine the Rayleigh factor, $R_\theta$, which is then utilized to calculate the molecular weight.

Heretofore, such low angle laser light scattering photometers have been limited to making a single measurement at a time, which measurement may be either Rayleigh, Brillouin, or Raman scattering or fluorescent radiation. However, there are occasions when such measurements alone are insufficient to provide a useful result. For example, in measuring particle size, the two desired quantities are scattering angle and the refractive index of the particle relative to that of the medium. Where the refractive index is known, the particle size may be determined from measuring the Rayleigh scattering at a single scattering angle. On the other hand, if the refractive index of the particle is unknown, measurements at more than one scattering angle must be made in order to determine particle size. In the past, this has required two separate and distinct sets of measurements which is not only time consuming but raises the probability of errors in the different measurements.

Another example results from the fact that different kinds of cells have different amounts of DNA. In making fluorescence measurements to determine DNA content, it is important to be able to identify the cell under study to determine whether it is the cell of interest or a foreign cell. The cell may be identified by determining its size and as discussed previously, this may be determined from light scattering measurements in the forward direction. Thus, it would be advantageous to simultaneously measure fluorescent radiation and Rayleigh scattering.

In another case, where information is desired about the chemical properties of a molecule, it may be advantageous to simultaneously measure Raman scattering and fluorescence or, since significant frequency differences occur, to simultaneously measure Rayleigh scattering and Raman scattering. Again, this has not been possible heretofore.

Finally, in making light scattering measurements, since $P_\theta \approx 10^{-9} P_0$, it is necessary that the background level resulting from unwanted light scattering be held to a minimum. This is especially critical when measuring light scattering from gases instead of liquids. The intensity of light scattered from gases is much smaller than that scattered from liquids and background is of great concern. However, background levels encountered previously have made light scattering measurements from gases difficult.

SUMMARY OF THE INVENTION

In accordance with the present invention, there is provided a laser photometer which permits simultaneous multiple measurements in a manner unattainable heretofore. The present photometer permits the simultaneous determination of particle size and refractive index by permitting the simultaneous measurement of scattered light at two different angles. The present photometer permits the simultaneous determination of particle size and DNA content by permitting the simultaneous measurement of light at two different wavelengths, one of which may be Rayleigh scattering and the other of which may be fluorescent radiation. In a similar manner, the present photometer permits the simultaneous determination of the chemical properties of materials together with size or other characteristics by permitting the simultaneous measurement of Rayleigh and Raman scattering or the simultaneous measurement of Raman scattering and fluorescent radiation. Finally, the present photometer permits a substantial reduction in the background level caused by unwanted light scattering and permits accurate measurements of light scattering from gases.

Briefly, the present invention represents in improvement of a laser photometer of the type including means for focusing a laser beam onto a sample, means for receiving a cone of light issuing from the sample in an incremental angle $\Delta\theta$ at a selectable angle $\theta$, means for focusing the cone of light onto the aperture of a field stop, and first detector means for measuring the radiant power passing through the aperture in the field stop. The improved apparatus includes first means for collimating the rays of light passing through the aperture in the field stop to form a cylinder of light having an incremental thickness $\Delta\alpha$, second means positioned in the path of the collimated rays for focusing the rays onto the first detector, and an elliptical mirror positioned at an angle of 45° relative to the collimated rays for intercepting and reflecting a portion of the rays within a first cylinder having an incremental thickness $\Delta\alpha_1$ and for passing to the first detector only the remaining portion of the rays within a second cylinder having an incremental thickness $\Delta\alpha_2$. Such mirror, in and of itself, reduces the background level in light scattering measurements by defining the inner edge of the light passing to the first detector, thereby eliminating scattering from the inner edge of the annulus which defines the cone of light. In addition, by providing a second detector and third means for focusing the rays reflected by the mirror onto the second detector, simultaneous measurements of scattered light at two different angles can be made. By placing various filters in the path of the first and second cylinders of light, the present photometer permits the simultaneous measurement of light at two different wavelengths.

OBJECTS

It is therefore an object of the present invention to permit simultaneous multiple measurements in laser photometers.

It is a further object of the present invention to permit the simultaneous measurement of light at two different angles in a laser light scattering photometer.

It is a still further object of the present invention to permit the simultaneous measurement of light at two different wavelengths in a laser photometer.

It is another object of the present invention to reduce the background level in laser light scattering photometers.

It is still another object of the present invention to provide a laser photometer which permits the simultaneous determination of particle size and DNA content.

Another object of the present invention is the provision of a laser photometer which permits the simultaneous determination of molecular weight and refractive index.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

BRIEF DESCRIPTION OF THE DRAWINGS

FIG. 1 is a cross-sectional view of the optical elements of a prior art low angle laser light scattering photometer as used for measuring radiant power scattered from a sample at small forward angles relative to the direction of the incident beam; and FIG. 2 is a cross-sectional view of the optical elements which permit the reduction of background and the simultaneous measurement of different characteristics of the radiant power passing through the field stop of the embodiment of FIG. 1.

DESCRIPTION OF THE PREFERRED EMBODIMENTS

Referring now to the drawings and, more particularly, to FIG. 1 thereof, a low angle laser light scattering photometer of the type described previously, generally designated 5, includes a source of radiant energy 6 which generates a beam of radiant energy defined by the rays 7. For light scattering studies, radiant energy source 6 is preferably a helium-neon laser operating in the $TEM_{00}$ mode. For simultaneous light scattering and fluorescent radiation measurements, radiant energy source 6 may preferably be a helium-cadmium laser. In either event, the beam from laser 6 is converged by a converging device 8, such as a refractive or reflective lens or an element of similar nature and characteristics, to a small spot or point 16 within a sample container 10 thereby irradiating a sample contained therein with an intense beam of radiant energy. The angle of convergence $\beta$ of the beam is generally small since the smallest angle $\theta$ relative to the direction of the incident beam at which scattered radiant energy from a sample may be measured without intercepting a portion of the transmitted incident beam is equal to $2\beta$. Source mask and aperture 9, which is located closely adjacent converging device 8, intercepts a predetermined amount of the converging beam along with other undesired radiant energy to more accurately define the converging beam passing therethrough.

Sample container 10 includes two thick silica windows 12 with a black Teflon spacer 14 therebetween. A small hole in the spacer serves as an aperture and forms a cell wall, point 16 being centered within such aperture. The cell volume with a 2.5 mm fixed spacer 14 is less than 0.010 ml so that both the sample size and the scattering volume is small. Samples are typically introduced through hypodermic needles inserted in spacer 14. The windows 12 are highly polished to reduce scattering.

Radiant energy issuing from the sample within spacer 14 and exiting from sample container 10 at a given angle $\theta$ is illustrated by rays 22. Rays 18 which are transmitted through sample container 10 and are a continuation of the undeflected incident rays are partially reflected as rays 23 from a radiant energy trap 20, with the remaining energy being absorbed by trap 20. Trap 20 may be a dark or black glass cylinder which absorbs radiant energy that enters and which has a 45° surface to partially reflect energy incident thereof at an angle of 90° with respect to the direction of incidence. The combined features of the abosrbing glass and 45° surface produce a radiant energy trap substantially more effective than the Rayleigh horn or cone traps and black glass attenuators used heretofore.

Rays 22 issuing from the sample within spacer 14 in an incremental angle $\Delta\theta$ at a given angle $\theta$ are intercepted by an annular aperture 26 in a radiant energy mask 24. Annular aperture 26 is symmetrically located about the axis of the incident beam so that the annular aperture 26 receives all of the energy issuing from the sample at angle $\theta$ in a conical surface having an apex at point 16 and a base formed by aperture 26.

The radiant energy designated by rays 22 intercepted by annular aperture 26 in mask 24 are directed to a converging device 28 where the radiant energy designated by rays 30 are converged into a conical surface having an apex at a point 36. The size of point 36 will depend upon the size of point 16 since point 36 is an image of point 16. Although the converging means 28 illustrated is a refractive lens, other converging apparatus may be employed such as circular reflective mirror, fiber optics, or other devices of similar nature and characteristics.

When it is desired to obtain a measurement of the transmitted incident radiant power defined by rays 18, trap 20 is removed and the rays are permitted to pass through a central aperture 19 in mask 24. The rays which pass through aperture 19 in mask 24 when trap 20 is removed pass through an attenuator 25 to converging device 28 where the rays are converged into a conical surface having an apex at point 36. Attenuator 25 is a safety attenuator to prevent damage to equipment and injury to personnel when trap 20 is removed. Additional calibrated attenuators 41, 42, and 43 may be positioned between source 6 and converging device 8 for insertion in the path of the beam from source 6 when trap 20 is removed. Attenuators 41-43 would be calibrated to reduce the intensity of the beam, when measuring the transmitted energy, to the approximate value of the intensity of the beam when measuring the scattered energy.

A field stop 32 having an aperture 34 therein is positioned such that aperture 34 coincides with point 36 thereby allowing the radiant energy focused onto point 36 to pass through field stop 32. Therefore, and as shown in FIG. 1, light trap 20, radiant energy mask 24, converging device 28, and field stop 32 combine to admit through aperture 34 only the energy issuing from the sample at the given angle $\theta$ and to essentially eliminate other undesired radiant energy.

As used heretofore, the radiant energy passing through aperture 34 in field stop 32 is directed to a converging device 37 where the radiant energy designated by rays 38 and the energy in the transmitted beam, not shown, are converged into conical surfaces having an apex at a point 40. Point 40 is made to coincide with a detector 45 where the scattered energy and the transmitted energy are received and detected to provide an output indicative of the radiant power in each beam. Detector 45 may be any type of detector having a sensitivity compatible with the wavelength of interest and a receiving area compatible with the optical design. Detectors used heretofore are photodiodes, photomultipliers, phototubes, or other devices of similar nature and characteristics. A suitable detector is described in the beforementioned article in Applied Optics.

As used heretofore, and with reference to FIG. 1, rays 7 from laser source 6 are focused by converging device 8 onto a sample confined within sample container 10. Certain of the rays scattered from the sample through an angle $\theta$, defined by annulus 26 in mask 24, are focused by converging device 28 onto aperture 34 of field stop 32. Rays passing through field stop 32 are focused by converging device 37 onto the end-window of a photomultiplier detector. The output of the detector is proportional to the total radiant power falling on the photocathode, $P_\theta$. At this time, the transmitted energy is blocked by trap 20.

Thereafter, trap 20 is removed and the rays 7 from laser source 6, attenuated by attenuators 41-43, are transmitted through the sample in the direction of the incident beam and after passing through aperture 19 in mask 24 and attenuator 25 are focused by converging device 28 onto field stop 32. The rays passing through field stop 32 are focused by converging device 37 onto the photocathode of the photomultiplier detector. The output of detector 45 is proportional to the total radiant power falling on the photocathode, $P_0$. The ratio $P_\theta/P_0$ is utilized to determine the Rayleigh factor, $R_\theta$, which is then utilized to calculate the molecular weight.

Referring now to FIG. 2, laser photometer 5 is modified so as to eliminate converging device 37 and to substitute the components shown. More specifically, the radiant energy passing through aperture 34 in field stop 32 is directed to a collimating device 50 where the radiant energy designated by rays 51 is collimated thereby forming a cylinder of light having an incremental thickness $\Delta\alpha$. Although the converging device 50 illustrated is a refractive lens, other collimating devices of similar nature and characteristics may be employed.

According to the embodiment of FIG. 2, a converging device 52 is positioned in the path of collimated rays 51 for focusing the light incident thereon into a conical surface having an apex at point 40. As in the embodiment of FIG. 1, point 40 is made to coincide with detector 45 where the received energy is detected to provide an output indicative of the radiant power thereof. Converging device 52 may be similar to collimating device 50.

Means 53 interposed between collimating device 50 and converging device 52 intercepts a portion of rays 51 to prevent the passage of such intercepted rays to focusing device 52 and detector 45. More specifically, and in accordance with the present invention, means 53 consists of an elliptical mirror positioned at an angle of 45° relative to rays 51 for reflecting a portion of the radiant energy, designated by rays 54, in a direction perpendicular to rays 51. The shape of mirror 53 is such that the projection thereof in a plane perpendicular to rays 51 is circular. In this manner, mirror 53 intercepts a portion of rays 51 within a first cylinder, designated by rays 54, having an incremental thickness $\Delta\alpha_1$. The remaining portion of rays 51, designated by rays 55, lying within a second cylinder having an incremental thickness $\Delta\alpha_2$, pass to converging device 52 where such rays are focused on detector 45.

The radiant energy reflected from mirror 53, designated by rays 54, is directed to a converging device 56 where the radiant energy, designated by rays 57, is converged into a conical surface having an apex at a point 58. Point 58 is made to coincide with a second detector 60 where the energy is received and detected to provide an output indicative of the radiant power therein. Detector 60 may be any type of detector having a sensitivity compatible with the wavelength of interest and a receiving area compatible with the optical design. Detector 60 may be identical to detector 45.

As will be described more fully hereinafter, the present laser photometer may include one or more narrow band filters 61 and 62 for selecting the wavelength of the radiant power received by detectors 45 and 60. Filter 61 is adapted to be positioned between mirror 53 and converging device 52 to select the wavelength of the radiant power received by detector 45 and filter 62 is adapted to be positioned between mirror 53 and converging device 56 to select the wavelength of the radiant power received by detector 60.

According to a first embodiment of the present invention, the apparatus of FIG. 2 is utilized without filters 61 and 62. In this case, mirror 53 operates to divide the scattered light issuing from the sample in an incremental angle $\Delta\theta$ into two portions, detector 60 receiving the light issuing from the sample in a first incremental angle $\Delta\theta_1$ and detector 45 receiving the light issuing from the sample in a second, non-overlapping incremental angle $\Delta\theta_2$. The outer circumference of the cone of light received by detector 60 is coincident with the inner circumference of the cone of light received by detector 45. The effect is that detectors 45 and 60 simultaneously receive light scattered at two different angles. Since the laws that govern the intensity of scattered light vary with angle, the outputs of detectors 45 and 60 may be used to determine refractive index and particle size without requiring a series of separate measurements. Furthermore, since the light received by both of detectors 45 and 60 is at the same wavelength as the incident light, neither filter 61 nor filter 62 is required.

According to a second embodiment of the present invention, the apparatus of FIG. 2 is utilized with filter 62 positioned between mirror 53 and converging device 56. In this case, filter 62 would be a narrow band filter transmitting radiation at a longer wavelength than the incident radiation and is used to cause detector 60 to respond only to fluorescent radiation issuing from the sample within container 10. In this case, the fact that two different angles are involved is irrelevant and the apparatus is employed to simultaneously measure light at two different wavelengths. Where filter 62 transmits fluorescent radiation, the apparatus of FIG. 2 may be used to simultaneously measure particle size and DNA content of a cell. Alternatively, the scattered light within incremental angle $\Delta\theta_2$ may be used for making any other known measurement and the fluorescent radiation received by detector 60 may be used for any other known purpose.

According to a third embodiment of the present invention, where information is desired about the chemical composition of a molecule while simultaneously determining the size thereof, the same configuration as in the second embodiment is used and filter 62 transmits radiation at a wavelength which causes detector 60 to respond only to Raman scattering issuing from the sample within container 10. In this case, detector 45 would receive the Rayleigh scattering issuing from the sample in an incremental angle $\Delta\theta_2$ while detector 60 would receive the Raman scattering issuing from the sample in an incremental angle $\Delta\theta_1$.

In both the second and third embodiments, it may be desirable to also use filter 61 as a narrow band filter transmitting radiation at the same wavelength as the incident light. This would be done in order to insure that detector 45 does not respond to the fluorescent radiation or the Raman scattering, as the case may be.

According to still a fourth embodiment of the present invention, the apparatus of FIG. 2 is used with both filters 61 and 62, one of which filters transmitting radiation resulting from Raman scattering and the other filter transmitting radiation resulting from fluorescent radiation. This permits the measurement of a quantity such as DNA content while simultaneously monitoring another chemical property of the molecule from the Raman scattering.

In any event, the apparatus of FIG. 2 permits the making of simultaneous measurements of different characteristics of the radiant power passing through aperture 34 in field stop 32. The present photometer permits simultaneous measurement of scattered light at two different angles or permits the simultaneous measurement of light at two different wavelengths. In the latter case, the present photometer permits simultaneous measurement of scattered light and reradiated light.

According to still another embodiment of the present invention, the apparatus of FIG. 2 may be used without filters 61 and 62 and with detector 60 inoperative or eliminated in order to reduce the background noise resulting from light scattering prior to field stop 32. More specifically, in the system of FIG. 1, the inner edge of annulus 26 normally defines the inner edge of the cone of light issuing from the sample at an angle $\theta$ and in an incremental thickness $\Delta\theta$. However, the inner edge of annulus 26 is responsible for a significant amount of defraction which results in light scattering and an increase in the background level. While scattering from the outer edge of annulus 26 also occurs, it is at a lower level. As can be seen from an inspection of FIG. 2, the inner edge of the cone of light passing through annulus 26 is blocked by mirror 53 so that mirror 53 now defines the inner edge of the cone of light which is transmitted to detector 45. Thus, mirror 53 may be used simply to eliminate the defraction from the inner edge of annulus 26 and the rays 54 may be transmitted to a light trap. Alternatively, where detector 60 is to be used, it would receive the rays but would be inoperative at this time.

While mirror 53 now defines the inner edge of the cylinder of light having an incremental thickness $\Delta\alpha_2$, which is received by detector 45, and some scattering will occur at the edges thereof, the illumination of mirror 53 is much smaller than the illumination of annulus 26 because of the position of mirror 53 on the detector side of field stop 32. Thus, mirror 53 can be used to reduce the background level and this would be of use primarily when measuring the scattering from gases instead of liquids.

It can therefore be seen that in accordance with the present invention, there is provided a laser photometer which improves photometers used heretofore by permitting simultaneous multiple measurements and permitting the reduction in background levels. The present photometer permits the simultaneous determination of particle size and refractive index by permitting the making of simultaneous measurements of scattered light at two different angles. The present photometer permits the simultaneous determination of particle size and DNA content by permitting the simultaneous measurement of light at two different wavelengths, one of which may be the result of Rayleigh scattering and the other of which may be the result of fluorescent radiation. In a similar manner, the present photometer permits simultaneous determination of the chemical properties of materials together with size and other characteristics by permitting simultaneous measurement of Rayleigh and Raman scattering or simultaneous measurement of Raman scattering and fluorescent radiation. Finally, the present photometer permits a substantial reduction in the background level caused by unwanted light scattering by defining the inner edge of the received angle on the detector side of the field stop. This permits accurate measurements of light scattering from gases.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims:

I claim:

1. In a laser photometer of the type including means for focusing a laser beam onto a sample, means for receiving a cone of light issuing from said sample in an incremental angle $\Delta\theta$ at a selectable angle $\theta$, means for focusing said cone of light onto the aperture of a field stop, and detector means for measuring the radiant power passing through said aperture in said field stop, the improvement comprising:
   first means for collimating the rays of light passing through said aperture in said field stop thereby forming a cylinder of light having an incremental thickness $\Delta\alpha$;
   second means positioned in the path of said collimated rays for focusing said rays onto said detector means; and
   third means interposed between said first and second means for intercepting a portion of said rays within a first cylinder having an incremental thickness $\Delta\alpha_1$ and for passing to said detector means only the remaining portion of said rays within a second cylinder having an incremental thickness $\Delta\alpha_2$.

2. In a laser photometer according to claim 1, the improvement wherein the outer circumference of said first cylinder is coincident with the inner circumference of said second cylinder.

3. In a laser photometer according to claim 2, the improvement wherein said third means comprises:
   a mirror positioned at an angle of 45° relative to said collimated rays for reflecting said rays within said first cylinder in a direction perpendicular to said collimated rays.

4. In a laser photometer according to claim 3, the improvement wherein said mirror is an elliptical mirror, the projection of which in a plane perpendicular to said collimated rays is circular.

5. In a laser photometer according to claim 1, the improvement further comprising:
   second detector means for measuring radiant power; and
   fourth means positioned in the path of said first cylinder of collimated rays reflected from said third means for focusing said rays onto said second detector means.

6. In a laser photometer according to claim 5, the improvement wherein said second detector means is responsive to light issuing from said sample in an incremental angle $\Delta\theta_1$, wherein said first-mentioned detector means is responsive to light issuing from said sample in a second, non-overlapping incremental angle $\Delta\theta_2$, and wherein $\Delta\theta_1$ and $\Delta\theta_2$ make up all of said light issuing from said sample in said angle $\Delta\theta$.

7. In a laser photometer according to claim 5, the improvement further comprising:
   first filter means interposed between said third means and said fourth means for selecting the wavelength of radiant power received by said second detector means.

8. In a laser photometer according to claim 7, the improvement wherein said first filter means comprises a narrow band filter transmitting radiation at a longer wavelength than that of said laser beam.

9. In a laser photometer according to claim 8, the improvement wherein said first-mentioned detector means is responsive to Rayleigh scattering issuing from said sample in an incremental angle $\Delta\theta_2$, wherein said second detector means is responsive to Raman scattering issuing from said sample in an incremental angle $\Delta\theta_1$, and wherein $\Delta\theta_1$ and $\Delta\theta_2$ make up all of said light issuing from said sample in said angle $\Delta\theta$.

10. In a laser photometer according to claim 7, the improvement wherein said first filter means comprises a narrow band filter transmitting fluorescent radiation issuing from said sample at a wavelength different from the wavelength of the light scattered from said sample.

11. In a laser photometer according to claim 10, the improvement wherein said first-mentioned detector means is responsive to Rayleigh scattering and wherein said second detector means is responsive to fluorescent radiation.

12. In a laser photometer according to claim 7, the improvement further comprising:
   second filter means interposed between said third means and said second means for selecting the wavelength of radiant power received by said first-mentioned detector means.

13. In a laser photometer according to claim 12, the improvement wherein said first and second filter means comprise narrow band filters transmitting radiation at a wavelength different from that of said laser beam.

14. In a laser photometer according to claim 12, the improvement wherein said first filter means comprises a narrow band filter transmitting fluorescent radiation issuing from said sample and wherein said second filter means comprises a narrow band filter transmitting Raman scattering issuing from said sample.

15. In a laser photometer according to claim 12, the improvement wherein said first and second filter means comprise narrow band filters, one of said filters transmitting radiation at a wavelength different from that of said laser beam and the other of said filters transmitting radiation at the wavelength of said laser beam.

16. In a laser photometer according to claim 1, the improvement wherein said third means defines the inner edge of said cone of light issuing from said sample which is received by said detector means.

* * * * *